United States Patent [19]

White

[11] Patent Number: 4,548,465
[45] Date of Patent: Oct. 22, 1985

[54] PANEL SEAL AND SUPPORT STRUCTURE FOR FIBER OPTIC CABLE

[75] Inventor: Allan E. White, Hightstown, N.J.

[73] Assignee: RCA Corporation, Princeton, N.J.

[21] Appl. No.: 540,759

[22] Filed: Oct. 11, 1983

[51] Int. Cl.[4] ............................................... G02B 7/26
[52] U.S. Cl. ................................................. 350/96.20
[58] Field of Search ............... 350/96.20, 96.21, 96.22; 174/70 S

[56] References Cited

U.S. PATENT DOCUMENTS

| | | | |
|---|---|---|---|
| 4,043,026 | 8/1977 | Weidhaas et al. | 350/96.21 X |
| 4,124,272 | 11/1978 | Henderson et al. | 350/96.21 |
| 4,132,461 | 1/1979 | Jacques et al. | 350/96.20 |
| 4,140,365 | 2/1979 | Burger et al. | 350/96.20 |
| 4,140,367 | 2/1979 | Makuch et al. | 350/96.22 |
| 4,155,624 | 5/1979 | Logan et al. | 350/96.21 |
| 4,199,222 | 4/1980 | Ikushima et al. | 350/96.19 |
| 4,214,809 | 7/1980 | Reh | 350/96.20 |
| 4,257,674 | 3/1981 | Griffin et al. | 350/96.21 |
| 4,277,135 | 7/1981 | Schrott et al. | 350/96.21 |
| 4,295,707 | 10/1981 | Nakai et al. | 350/96.20 |
| 4,296,996 | 10/1981 | Niiro et al. | 350/96.20 |
| 4,461,538 | 7/1984 | Breed, III et al. | 350/96.20 |

FOREIGN PATENT DOCUMENTS

1579309  11/1980  United Kingdom ............. 350/96.20

*Primary Examiner*—John Lee
*Attorney, Agent, or Firm*—Joseph S. Tripoli; George E. Haas; William Squire

[57] ABSTRACT

A tubular member having an O-ring seal on a shoulder is locked in a panel opening with a nut. An elastomeric sleeve is bonded to an extended sleeve portion of the tubular member. Two elastomeric mirror image inserts forming one or more fiber optic cable cavities are assembled around the cables and inserted into engagement with the elastomeric sleeve internal surface. A hose clamp compresses the elastomeric sleeve against the elastomeric elements, firmly clamping the elements and the cables in place.

8 Claims, 2 Drawing Figures

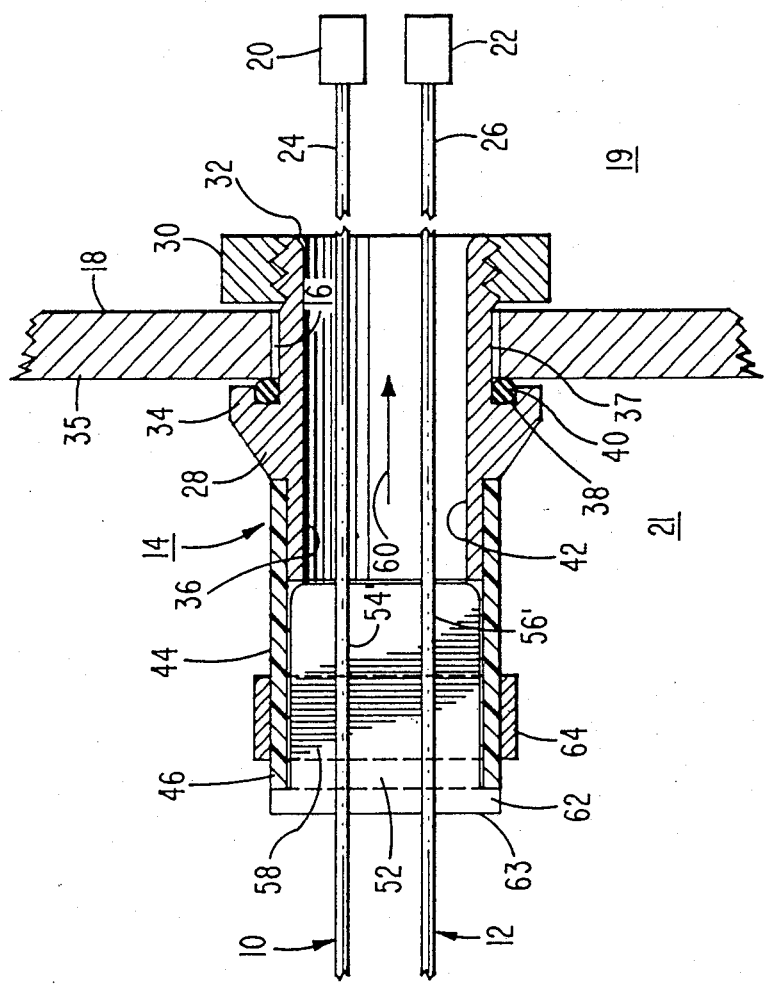
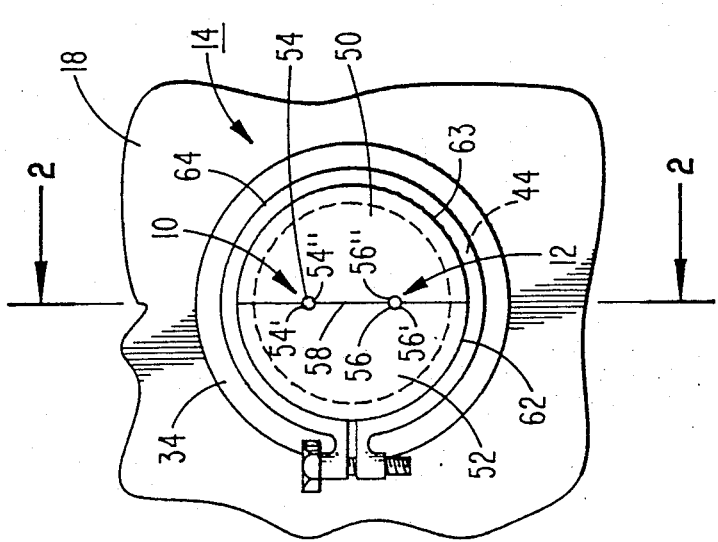
Fig. 2
Fig. 1

PANEL SEAL AND SUPPORT STRUCTURE FOR FIBER OPTIC CABLE

The present invention relates to an interface structure between a panel and fiber optical cable passing through the panel.

Fiber optic cables include terminating connectors at the cable ends. The terminating connectors connect the cable to equipment which receive or transmit signals on the cable. These connectors tend to be relatively bulky and considerably larger than the diameter of the fiber optic cable.

A problem in installing such terminated cables in equipment housings occurs when it is desired to hermetically seal the housing from the ambient environment. It is usually necessary to install the terminated end of the cable through an opening in the housing wall. To pass the terminated end through the housing wall requires a relatively large opening, as compared to the cable diameter, to accommodate the connector and, therefore, would not provide a good seal between the cable and wall. In this case, disassembly of the connector from the cable is required. In some cases, however, the installation of a disassembled terminated end into the housing is not always possible; due to the relatively small space present in some housings which does not lend itself to easy reassembly of the terminating connector onto the cable end. In this latter instance the terminated end generally is required to be passed through the housing wall. Present designs and adaptors for coupling the fiber optic cable to the housing wall in such cases do not provide good sealing engagement between the cable and the housing wall or provide good strain relief for the cable.

A panel seal and support structure for a fiber optic cable passing through an opening in a panel, according to the present invention, comprises a tubular member having first and second ends. Means are coupled to the member for securing the member at the first end to the panel at the opening. An elastomeric sleeve is secured to the second end. First and second elastomeric elements are adapted to be closely received in the sleeve and abut along facing surfaces. The interface of the facing surfaces forms at least one aperture of a given dimension for closely receiving the cable. Clamp means are engaged with the sleeve and adapted to clamp the sleeve to the elements and tend to thereby reduce the size of the aperture. The resulting structure can provide a hermetic seal between the cable and the panel and also strain relief and support for the cable at the panel.

In the drawings:

FIG. 1 is an end view of the panel seal and support structure according to one embodiment of the present invention; and FIG. 2 is a sectional view of the structure of FIG. 1 taken along lines 2—2.

In FIGS. 1 and 2, a pair of predetermined fiber optic cable assemblies 10 and 12 are shown supported by a panel seal and support structure 14 and passing through an opening 16 in a panel 18. Panel 18 is one wall of a housing (not shown) having an interior volume 19 which is desired to be sealed from the ambient environment 21.

Fiber optic cable assemblies 10 and 12 are terminated with terminations 20 and 22, respectively. The terminations 20 and 22 are conventional devices (which need not be described in detail herein) connected to the respective cables 24 and 26 of cable assemblies 10 and 12. The terminations 20 and 22 are considerably larger than the diameters of the respective cables 24 and 26. However, the terminations 20 and 22 are each sufficiently smaller than the diameter of the opening 16, which may be a circular hole, so that they may easily pass through the opening 16.

The support structure 14 includes a tubular member 28, a nut 30, attached to threads 32 on the external surface at one end of the member 28, an annular shoulder 34 approximately midway along the length of member 28, and a sleeve portion 36 on the end of member 28 opposite the threaded end. The threads 32 of the member 28 extend beyond the panel 18. Surface 37 at the midsection of member 28 is closely received by the opening 16 in panel 18. Annular O-ring groove 38 is in shoulder 34 and faces surface 35 of the panel 18. O-ring 40 is in groove 38. The O-ring 40 has a diameter sufficiently large so it protrudes beyond groove 38 and engages surface 35, sealing the interface between shoulder 34 and the panel 18 surface 35. The nut 30 threaded onto threads 32 of member 28 tightly clamps the panel surface 35 against the O-ring 40, locking and sealing member 28 to panel 18.

The internal diameter at surface 42 of member 28 is sufficiently larger than either of the terminations 20 and 22 of the cables 10 and 12 permitting those terminations to pass therethrough, for example, from left to right of the drawing.

An elastomeric sleeve 44, which may be rubber or a thermoplastic material, is closely received over and securely bonded to the outer surface of sleeve portion 36 of member 28. One bonding material may be cyanacrylate glue. The glue securely bonds the entire periphery of one end of the elastomeric sleeve 44 to the tubular member 28 portion 36 to form a hermetic seal therebetween. The sleeve 44 has a portion 46 which extends beyond the end of the member 28. The sleeve 44 is sufficiently flexible to readily expand or contract upon application of force, but is sufficiently high in strength to provide cable support and strain relief, as will be described below. Materials for such purposes are well known.

The fiber optic cable assemblies 10 and 12 are passed through the combined internal openings of the tubular member 28 and the elastomeric sleeve 44 into the interior housing cavity 19 containing equipment to which the terminations 20 and 22 are to be attached.

The cables 24 and 26 are securely fastened to the elastomeric sleeve 44 by two elastomeric inserts 50 and 52, FIG. 1, and a conventional hose clamp 64. Inserts 50 and 52 each comprise like mirror image semicircular cylindrical elastic elements having a flange 62 extending around the periphery of sleeve 44 at end 63. The inserts 50, 52 may be made of rubber, thermoplastic or other relatively stiff, compressible material. The inserts 50 and 52 each have facing elongated channel-like recesses 54", 56" and 54', 56', respectively, which together form circular cylindrical openings 54 and 56 for receiving the respective cables 24 and 26. One-half of the openings 54 and 56 are formed by the semicircular cylindrical recesses 54', 56' in the insert 52 and by like mirror image recesses 54", 56" in the insert 50. The inserts 50 and 52, when joined at the interface 58 therebetween, form a circular cylindrical plug-like member having two circular cylindrical conduits or openings 54 and 56. The mating interface 58 between the facing surfaces of the two inserts 50 and 52 may be planar. While two openings 54 and 56 are shown for the two corresponding cables 24 and 26, more of fewer openings may be provided in accordance with a given implementation.

The elastomeric inserts 50 and 52 are assembled by aligning the insert recesses 54', 54" and 56', 56" over the respective cables 24 and 26. The inserts are then held in abutting facing relation outside the extended end of sleeve 44. Then the elements, with the cables 24, 26 clamped manually therebetween, are slid in the direction 60, FIG. 2, into the internal cavity of the elastomeric sleeve 44 until the end flanges 62 of elements 50 and 52 abut the extended edge of the elastomeric sleeve 44, as shown. The inserts 50 and 52 together form a circular cylinder which is closely received within or are in interference fit with the internal diameter of the elastomeric sleeve 44. The inserts 50 and 52 are easily attached to the cables 24 and 26 since they are separate pieces and are placed in facing mirror image fashion over the cables 24 and 26 outside the elastomeric sleeve 44 and then slid along the cables until the elements and cables of sleeve 44 are engaged as shown in FIG. 2. The sleeve 44 may be stretched slightly during the insertion of inserts 50, 52 thereto.

The hose clamp 64 is placed over the outer surface of the elastomeric sleeve 44 in an area surrounding the inserts 50 and 52 and tightened, compressing somewhat the elastomeric sleeve 44 an amount suffficient to reduce the diameter of the combined inserts 50 and 52. This action forms a hermetic seal between elements 50, 52 and sleeve 44 and reduces the diameter of the openings 54 and 56 so that they engage the cables 24 and 26 hermetically sealing the cables to the elements 50, 52. Tightening the hose clamp 64 firmly clamps the cables 24 and 26 to elements 50, 52 with relatively high friction engagement. The inserts 50 and 52 are thus compressably attached to the cables. This compression induces friction forces sufficient to provide strain relief between the panel seal and support structure 14 and the cables 24, 26. That is, tensile stresses on the cables 24 and 26, which are external to the panel 18 and sleeve 44, are absorbed by the seal and support structure 14. This action prevents transmittance of such stresses to the terminations 20 and 22, preventing inadvertent tearing loose of the terminations by such stress.

The cable assemblies 10 and 12 may be easily removed by loosening the hose clamp 64 and grasping the flanges 62 of the elements 50, 52, sliding the elements 50, 52 in the direction opposite direction 60 until free of sleeve 44 and thereby enabling the elements to be separated, freeing the cables.

The panel seal and support structure 14 may be made in a variety of diameters corresponding to different size openings 16 in a panel 18. These different sized structures 14 may accommodate cables 24 and 26 of different diameters. The resulting structure provides a hermetic seal between the ambient environment 21 and the interior volume 19 to be sealed. The terminations 20 and 22 readily pass through the internal opening of the elastomeric sleeve 44 and the tubular member 28 to permit ease of assembly of the cable assemblies to equipment in close quarters, for example, a small housing of which panel 18 is part. This eliminates the need to disassemble the terminations 20 and 22 from the cables 24 and 26. Although the cable assemblies are securely fastened to the panel 18, they are readily released and disassembled from panel 18 without disturbing the terminations 20, 22.

What is claimed is:

1. A panel seal and support structure for a fiber optic cable passing through an opening in said panel comprising:

a tubular member having first and second ends;
    means for securing said first end of the tubular member to said panel at said opening;
    an elastomeric sleeve secured to said second end;
    first and second elastomeric elements abutting along mating facing surfaces and closely received in said sleeve, the interface of said surfaces forming at least one aperture of a given dimension for closely receiving said cable; and
    clamp means engaged with said sleeve for clamping said sleeve to said elements and compressing the elements to frictionally engage the received cable.

2. The structure of claim 1 wherein said means for securing includes means for hermetically sealing said tubular member to said panel.

3. The structure of claim 1 wherein said sleeve is bonded to said second end to form a hermetic seal thereto.

4. The structure of claim 1 wherein said first and second elastomeric elements form a plurality of cable receiving apertures at said interface.

5. A panel seal and support structure for a fiber optic cable passing through an opening in said panel comprising:

a hollow member having a threaded exterior surface at one end adapted to pass through said opening, and a cylindrical sleeve portion at a second end opposite the one end, said member having an annular portion between said ends of greater diameter than said threaded exterior surface forming a shoulder which is adapted to abut a surface of said panel when said threaded surface passes through said opening;
    an elastomeric sleeve secured to said sleeve portion of said member;
    first and second elastomeric members closely received within said elastomeric sleeve, said elastomeric members abutting along facing surfaces thereof, said facing surfaces forming at least one opening for closely receiving a portion of said fiber optic cable; and
    clamp means engaged with said elastomeric sleeve for resiliently clamping said sleeve against said elastomeric members and said elastomeric members against said received cable.

6. The structure of claim 5 wherein said elastomeric members form a cylindrical element, said element including a shoulder portion abutting an edge of said elastomeric sleeve.

7. The structure of claim 5 wherein said shoulder has an annular groove, said structure further including sealing means in and extending from said groove for sealing engagement with said panel surface.

8. The structure of claim 5 wherein said elastomeric sleeve is bonded to said sleeve portion of said hollow member to form a hermetic seal therebetween.

* * * * *